Jan. 28, 1958 L. M. GILBERTSON 2,821,167
FLEXIBLE SUSPENDED AUTOMATIC WATERING SYSTEM
Filed July 22, 1957 2 Sheets-Sheet 1
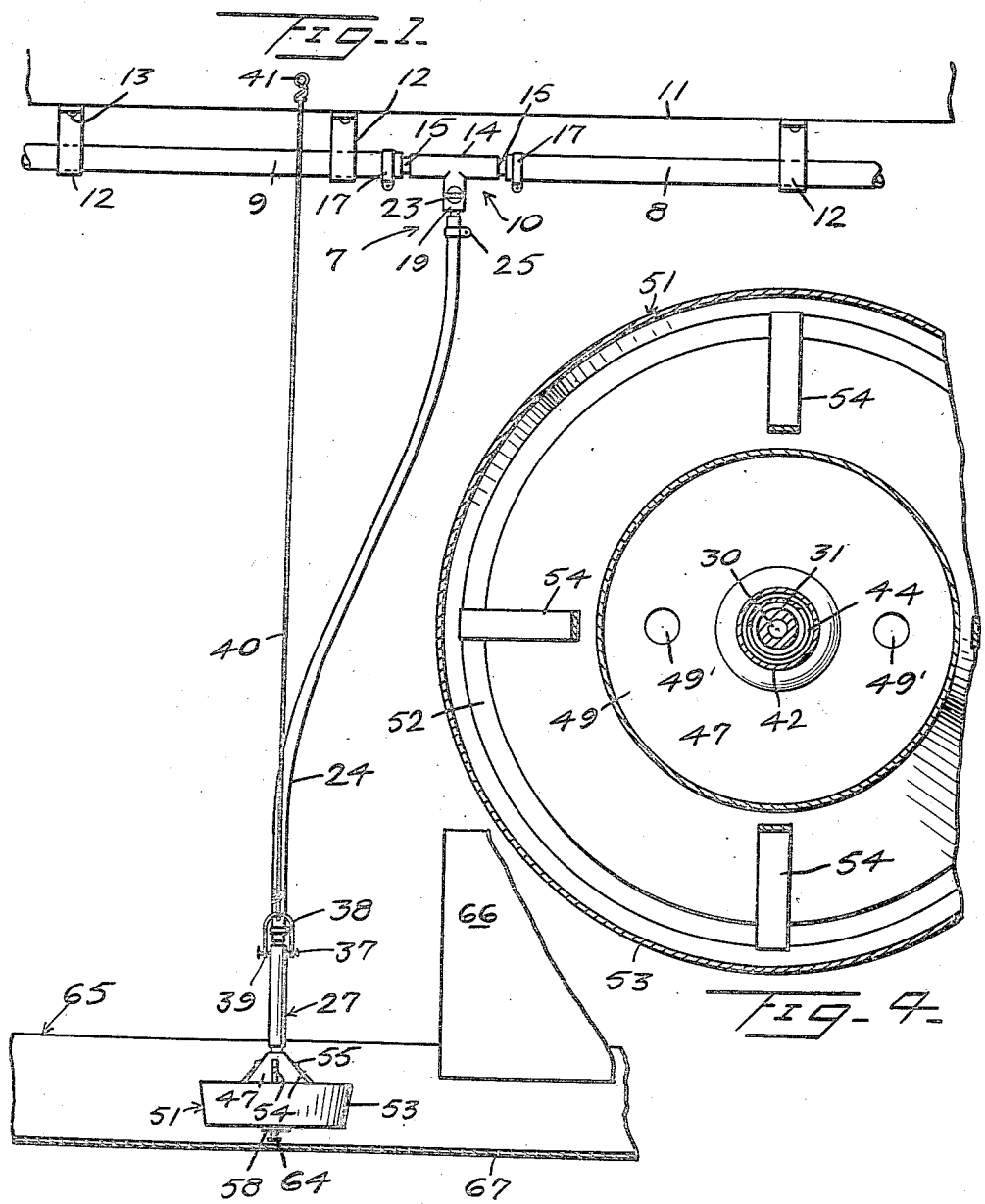
INVENTOR
L. M. Gilbertson
BY John N. Randolph
ATTORNEY Jan. 28, 1958 L. M. GILBERTSON 2,821,167
FLEXIBLE SUSPENDED AUTOMATIC WATERING SYSTEM
Filed July 22, 1957 2 Sheets-Sheet 2
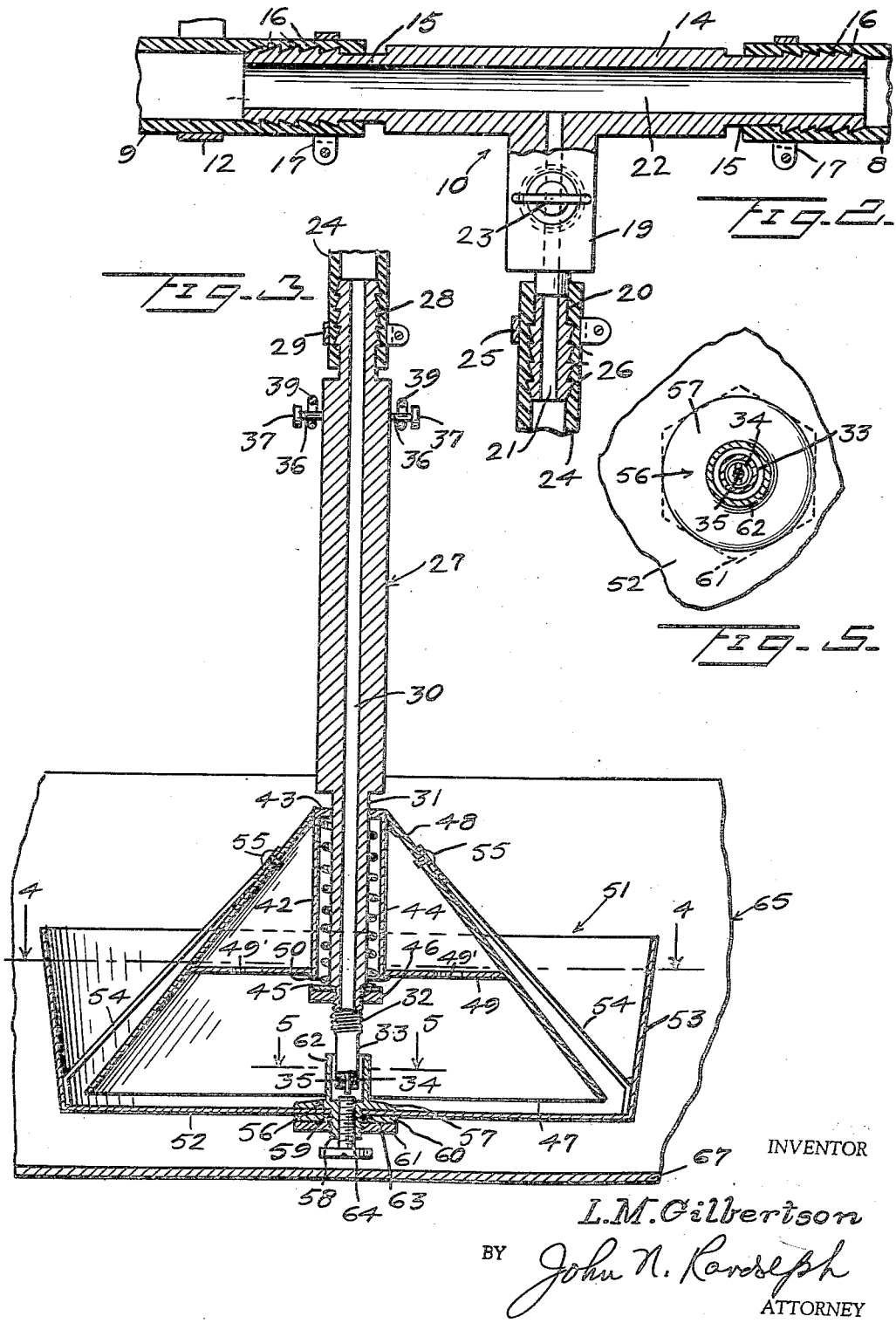
INVENTOR
L. M. Gilbertson
BY John N. Randolph
ATTORNEY

United States Patent Office 2,821,167
Patented Jan. 28, 1958

2,821,167

FLEXIBLE SUSPENDED AUTOMATIC WATERING SYSTEM

Louis M. Gilbertson, Brasstown, N. C.

Application July 22, 1957, Serial No. 673,329

6 Claims. (Cl. 119—81)

This invention relates to an automatic watering system for poultry and more particularly to an automatic waterer which is adapted to be used by chickens, from the time the chicks are newly hatched until fully grown and ready for the market.

More particularly, it is an aim of the present invention to provide a portable watering system by means of which a plurality of waterers may be connected to a main supply line of the system and supported in any position convenient to the chickens such as in a draft guard adjacent a brooder.

Another object of the invention is to provide a watering system wherein any number of waterers can be connected to the main line forming a part of the system and wherein individual waterers may be shut off when desired without affecting the supply of water to other waterers of the system.

Another object of the invention is to provide an automatic waterer having automatically actuated valve means for maintaining a predetermined water level in the receptacle of the system and which may be manually adjusted without dismantling any part of the system or removing the receptacle to vary the level at which the water will be maintained in the receptacle.

A further object of the invention is to provide guide means associated with a water level responsive valve and the automatic adjustment means thereof to prevent wobbling of the water receptacle relative to the valve and which frequently results in canting of the valve and failure of the valve to open or close due to sticking.

Another object of the invention is to provide an automatic waterer wherein the individual watering units may be moved at will so as not to provide an obstruction when catching and removing chicks or while cleaning a brooder or draft guard or replacing a litter.

A further object of the invention is to provide watering units having means to effectively prevent splashing of water from the drinking receptacle, to avoid wetting the litter, and which means effectively functions to prevent chicks falling into the drinking receptacle and drowning.

Various other objects and advantages of the invention will hereinafter become more fully apparent from the following description of the drawings, illustrating a presently preferred embodiment thereof, and wherein:

Figure 1 is an elevational view with parts in section of a portion of the flexible suspended automatic watering system including one of the flexibly supported watering units;

Figure 2 is an enlarged vertical sectional view, partly in elevation, of a portion of the watering system;

Figure 3 is an enlarged fragmentary vertical sectional view of a part of one of the individual watering units;

Figure 4 is an enlarged fragmentary horizontal sectional view through the watering unit, taken substantially along a plane as indicated by the line 4—4 of Figure 3, and Figure 5 is an enlarged fragmentary horizontal sectional view through another part of said watering unit, taken substantially along a plane as indicated by the line 5—5 of Figure 3.

Referring more specifically to the drawings, the automatic watering system in its entirety is designated generally 7 and includes a plurality of conduit sections 8 and 9, which are preferably formed of plastic or other flexible tubing and which constitute a part of a main water supply line, one end of which, not shown, is adapted to be connected to a source of water supply, and the other end of which, not shown, can be capped. A T-coupling 10 is interposed between and connected to adjacent ends of the conduit sections 8 and 9 and, as the description proceeds, it will be understood that additional couplings 10 may be provided for connecting additional sections corresponding to the conduit sections 8 and 9. The main supply conduit 8, 9 of the watering system 7 is adapted to be supported in an overhead position, as for example beneath a beam or ceiling member 11 by U-shaped strap members 12 having end portions secured by fastenings 13 to the underside of the beam 11 and which engage under said conduit sections 8 and 9 for supporting the conduit including its couplings 10.

As best seen in Figure 2, the T-coupling 10 includes a straight rigid tubular portion 14 having externally restricted ends 15 over which the adjacent ends of the conduit sections 8 and 9 fit. Said restricted ends or nipples 15 are provided with external annular ribs 16 to retain the conduit sections thereon, and a conventional split clamping ring 17 engages around each of said conduit ends for clamping said adjacent ends on the nipples 15. The coupling 10 also includes a depending conduit portion 19 which terminates at its lower end in an externally restricted nipple 20 having an outer diameter of substantially less than the diameter of the nipples 15. The bore 21 of the branch arm 19, which extends from end-to-end therethrough, is of a diameter substantially less than the diameter of the bore 22 of the conduit portion 14, with which one end of the bore 21 communicates. The enlarged upper portion of the branch arm 19 is provided with a manually actuated shutoff valve 23 for controlling the passage through the bore 21.

One end of a flexible conduit 24 engages over the nipple 20 and is clamped thereto by a third clamping ring 25. The nipple 20 is also provided with external annular ribs 26, for the same purpose as the ribs 16. The flexible conduit 24, which preferably constitutes a length of plastic hose, is of a substantially smaller size in cross section than the conduit sections 8 and 9, both externally and internally.

An elongated rigid tubular body member 27 has an externally restricted and externally ribbed upper end forming a nipple 28, corresponding to the nipple 20, which fits in the other lower end of the tube 24 and to which said lower tube end is secured by a clamping ring 29, corresponding to the clamping ring 25. The tubular member 27 has a bore 30 of uniform diameter extending from end-to-end therethrough, and which is preferably of a diameter substantially corresponding to that of the bore 21. The rigid conduit member 27 is provided with an externally restricted lower portion 31 beneath which is a further externally restricted threaded portion 32, which is disposed above a further restricted externally smooth portion 33, which constitutes the lower end of the conduit 27. A conventional valve 34 of the type used in inner tubes of pneumatic tires is threadedly mounted in the lower end of the bore 30 and has a valve stem 35 which projects downwardly from the lower end of the bore 30 and the lower end of the conduit portion 33, as seen in Figure 3.

Diametrically opposed pins or studs 36 extend outwardly from the tubular member 27, beneath and adjacent the nipple 28 and have heads 37 at their outer ends. A bail 38 has looped ends forming eyes 39 which engage the pins 36 and which are retained thereon by the heads 37. As seen in Figure 1, a flexible nonelastic strand 40, such as a length of wire, has a lower end secured to the bail 38 and an upper end secured to an anchoring element 41 which is anchored in the beam 11 for supporting the body member 27 and the lower portion of the hose 24, so that slack will exist in the hose 24 between the coupling 10 and the body member 27, as seen in Figure 1. Said flexible strand 40 also supports the elements carried by the body member 27, hereinafter to be described.

A sleeve 42, as best seen in Figure 3, is disposed loosely around the portion 31 and has an inturned annular flange 43 at its upper end of an internal diameter to slidably engage the externally smooth body portion 31. A compression spring 44 is loosely mounted in the sleeve 42 and fits loosely about the portion 31. The upper end of the spring 44 bears against the underside of the flange 43 and the lower end of said spring bears on a washer 45 which in turn rests on and is supported by a nut 46. The nut 46 threadedly engages the portion 32 and with the washer 45 forms an adjustable abutment for the lower spring end. The sleeve 42, which provides a housing for the spring 44, also supports a shield 47 which is preferably in the form of a hollow truncated cone having a restricted upper end which fits around and is secured as by soldering or welding as seen at 48 to the upper end of the sleeve 42. An annular reinforcing disk or brace 49 fits snugly around the lower end of the sleeve 42 and is supported thereon as by burring the lower end of the sleeve 42 beneath the brace 49, as seen at 50. The periphery of the brace 49 bears against the inner side of an intermediate portion of the shield 47 to prevent any wobbling or rocking movement of the shield relative to the sleeve 42.

A relatively shallow water container or receptacle 51 has a substantially flat bottom 52 and an annular upstanding wall 53 which is preferably flared slightly from its lower to its upper end. A plurality, preferably four, metal straps 54 have lower ends secured to the wall 53 in any conventional manner. Said straps 54 are preferably secured to the inner side of the lower portion of the wall 53 in equally spaced apart relation to one another and extend upwardly and inwardly therefrom on the outer side of the shield 47. The enlarged lower end of the shield 47 is of a smaller diameter than the bottom of the receptacle 51, as seen in Figures 3 and 4. The upper ends of the straps 54 are secured to the shield 47 by screw fastenings 55, adjacent the upper end of said shield, so that the receptacle 51 is suspended by the straps 54 from the shield 47 and so that the receptacle surrounds a substantial portion of the shield and with the open bottom of the shield disposed in close proximity to but spaced from the receptacle bottom 52 and the lower portion of the wall 53. The brace 49 is provided with apertures 49' so that the chamber formed by the upper portion of the shield 47 and said brace 49 is not sealed. In addition, sufficient clearance exists between the internal flange 43 and the body portion 31 to permit an escape of air therethrough so that air will not be trapped beneath the shield, to enable a part of the water contained in the receptacle 51 to rise into the shield 47.

A guide, designated generally 56, includes a base portion 57 which rests flush on the upper side of the central portion of the receptacle bottom 52 and which has a depending threaded stem 58 extending downwardly through a central opening 59 of the bottom 52. A sealing gasket 60 is supported on the stem 58 against the underside of the bottom 52 by a nut 61 which threadedly engages the stem 58 and which is tightened to compress the gasket 60 for sealing the opening 59. The base 57 has an upstanding cylindrical portion 62 forming a guide for the restricted body portion 33, the lower portion of which is disposed loosely therein. The stem 58 has a threaded bore 63 extending therethrough and through the base 57 to receive an adjusting screw 64 which is threaded upwardly therethrough and has an upper end adjustably disposed in the guide 62 to be engaged by the valve stem 35.

From the foregoing it will be readily apparent that any desired number of watering units including a coupling 10, hose 24, body member 27 and the parts supported thereby may be interposed in the main water supply line 8, 9 and at points spaced any desired distance apart for locating the drinking receptacles 51 in any desired location. It will also be apparent that the main line 8, 9 may extend in various directions so that the drinking receptacles 51 may be positioned where needed. Each receptacle 51 is flexibly suspended by its strand element 40 so that the lower end or head of the adjusting screw 64 will be spaced from a supporting surface. In Figures 1 and 3 the receptacle 51 is shown disposed in a conventional draft guard 65, adjacent a brooder 66, and with the lower end or head of the screw 64 disposed above and spaced from the draft guard bottom 67. The nut 46 is adjusted so that said nut and the washer 45 will be spaced from the lower end of the sleeve 42 when the receptacle 51 is approximately half full of water, and so that the parts will then be disposed as illustrated in Figure 3. With the parts thus disposed, the flange 43 is spaced from the upper end of the body portion 31 so that the sleeve 42, shield 47 and receptacle 51 are capable of upward and downward movement relative to the body member 27. With the parts thus disposed, the screw 64 is adjusted so that its upper end will be spaced somewhat from the lower end of the valve stem 35. The receptacle 51 is made quite shallow so that newly hatched chicks may readily drink therefrom. The shield 47 will minimize any surging movement of the water in the receptacle 51 to prevent the water being splashed from the receptacle into the litter, not shown, contained in the draft guard 65. In addition, said shield 47 functions to prevent small chicks which perch on the rim of the wall 53 and fall into the receptacle 51 from being drowned, as frequently occurs where deeper unprotected drinking receptacles are employed.

It will also be apparent that the parts disposed below the hose 24 may be readily swung aside to afford complete access to the area 65 supplied by said drinking receptacle, for cleaning said area and for catching and removing chicks. Also, the elevation of the drinking receptacle 51 can be varied as desired by merely taking up or shortening the supporting strand 40. Also, the supply of water to the receptacle 51 can be shut off by closing the valve 23 without affecting the supply of water to other receptacles 51, not shown, which are similarly connected to the supply line 8, 9.

It will also be readily apparent that the liquid level to be maintained in the receptacle 51 can be adjusted without dismantling any of the parts or removing said receptacle, by merely turning the screw 64, the head of which is accessible beneath the receptacle 51 at all times.

Various modifications and changes are contemplated and may be resorted to, without departing from the function or scope of the invention as hereinafter defined by the appended claims.

I claim as my invention:

1. An automatic poultry watering system comprising a main water supply conduit, means supporting said conduit in an overhead position, at least one flexible conduit connected to and forming a depending branch of said main conduit, an elongated rigid tubular body member connected to and depending from the lower end of said flexible conduit, nonelastic flexible means suspended from said supporting means and connected to said body member for supporting the body member and the lower portion of the flexible conduit, an open top drinking receptacle surrounding the lower end of said body member, a hollow conical shield surrounding the lower portion of said body member, spring means yieldably supporting said shield on said body member, connecting means connecting the receptacle to said shield for supporting the receptacle around the enlarged lower portion of the shield, spaced from and out of contact therewith, an upwardly opening valve mounted in the lower end of the bore of said body member and having a stem projecting downwardly therefrom, and an abutment extending upwardly from the receptacle bottom for engaging the valve stem to open the valve when the shield and receptacle are elevated to a predetermined extent relative to said body member for automatically replenishing the supply of water in the receptacle.

2. An automatic poultry watering system as in claim 1, a rigid T-coupling interposed in and forming a part of said main water supply conduit and having a branch connected to said flexible conduit, and a valve mounted in said branch for manually shutting off the supply of water to said body member.

3. An automatic poultry watering system as in claim 2, said main water supply conduit including flexible hose sections connected to and extending from aligned end portions of said coupling.

4. An automatic poultry watering system as in claim 1, a sleeve connected to and extending downwardly from the restricted upper end of said shield and having a restricted upper end slidably engaging and surrounding a portion of said body member, said spring means comprising a compression spring loosely disposed in said shield and loosely fitting around a part of said body member and having an upper end bearing against the restricted upper end of the sleeve, and a spring stop adjustably mounted on said body member beneath and spaced from the lower end of the sleeve and bearing against the lower end of said compression spring.

5. An automatic poultry watering system as in claim 1, a guide member secured to the central portion of the receptacle bottom and having an upwardly extending cylindrical guide portion fitting loosely around said lower end of the body member to prevent canting of the receptacle relative to said body member, and said abutment comprising a screw extending threadedly through the lower portion of said guide member and projecting into the lower end of said cylindrical guide portion, said screw having a head at the lower end thereof disposed beneath the receptacle and guide member and adapted to be manually engaged for adjusting the spacing between said screw and the valve stem for varying the upward movement of the receptacle under the biasing action of the compression spring required to open said valve for varying the level at which water will be maintained in the receptacle.

6. An automatic poultry watering system as in claim 1, said receptacle being relatively shallow, the open bottom of said shield extending to adjacent the bottom of the receptacle and to adjacent the surrounding wall of the receptacle to provide a relatively narrow annular drinking trough between the shield and the surrounding wall of the receptacle.

No references cited.